United States Patent [19]
Malina

[11] 3,762,389
[45] Oct. 2, 1973

[54] ROCKING PISTON BEARING
[75] Inventor: John A. Malina, Westchester, Ill.
[73] Assignee: General Motors Corporation, Detroit, Mich.
[22] Filed: June 26, 1972
[21] Appl. No.: 266,062

[52] U.S. Cl. ......... 123/197 AB, 123/193 P, 184/6.5, 92/157, 92/187
[51] Int. Cl. ............................ F16j 1/14, F16c 5/00
[58] Field of Search .................. 123/193 P, 197 AB, 123/197 A; 92/157, 187; 184/6.5

[56] References Cited
UNITED STATES PATENTS

| | | | |
|---|---|---|---|
| 2,184,435 | 12/1939 | Saxe | 308/2 R |
| 2,566,080 | 8/1951 | Davids | 92/157 X |
| 3,053,595 | 9/1962 | Dilworth | 92/187 UX |
| 3,056,638 | 10/1962 | Hovde | 123/197 A X |
| 3,476,021 | 11/1969 | Williams | 92/187 |
| 3,555,972 | 1/1971 | Hulsing | 92/157 |

*Primary Examiner*—Al Lawrence Smith
*Attorney*—J. L. Carpenter et al.

[57] ABSTRACT

In a preferred embodiment, an engine piston-connecting rod assembly includes rocking bearing means having two sets of cooperating bearing surfaces which alternate in accepting compression loads while providing for separation of each set of surfaces when unloaded to permit the admission of lubricant. The position of the load transfer point between one set of bearing surfaces and the other is selected so that a load transfer is timed to occur closely following the occurrence of the cyclic peak load point for each cycle, with the result that average lubricant film thickness in the bearing is maximized.

3 Claims, 4 Drawing Figures

ROCKING PISTON BEARING

FIELD OF THE INVENTION

This invention relates to rocking type oscillatory bearings for internal combustion engines and the like and, more particularly, to rocking type piston bearings wherein the load transfer point is selected in a manner to maximize the lubricant film thickness in the bearing during operation.

BACKGROUND OF THE INVENTION

It is known in the art relating to oscillatory bearing connections to provide two pairs of opposed cooperating bearing surfaces on the connected parts and arranged to alternately accept compressive loads while permitting the unloaded pair of surfaces to separate and thereby permit the admission of lubricant therebetween. Such constructions, often referred to as "rocking" bearings, have been primarily intended for use in situations where an oscillating bearing connection is subjected to loads which act continuously in one direction, since it is in such bearing situations that it is most difficult to maintain an oil film between the opposed, relatively oscillating, bearing surfaces. Obviously, however, rocking type bearings may equally well be used in applications which do not call for continuous unidirectional loading.

Some representative examples of the prior art application of rocking type bearings are disclosed in United States Pat. Nos. 2,184,435 Saxe, granted Dec. 26, 1939 and 3,056,638 Hovde granted Oct. 2, 1962.

SUMMARY OF THE INVENTION

The present invention provides for proper selection of the load transfer point of a rocking bearing, subject to a cyclic peak loading condition, so that the load transfer is timed in a manner to maximize the average lubricant film thickness between the loaded cooperating bearing surfaces under operating conditions.

In many applications of rocking type oscillatory bearings, of which use as the piston bearing in a two-stroke cycle engine may be an example, the bearing may, in operation, be subject to a continuous compressive load which varies in intensity, culminating in a peak cyclic load that occurs, in most cases, slightly after the top dead center position of the piston in its operating cycle. In most cases, the cyclic peak load occurs during a relatively small portion of the complete cycle and is often several times greater than the loads occurring during the remainder of the bearing operating cycle.

I have recognized that the application of the peak load forces to either of the two sets of cooperating bearing surfaces of the rocking type bearing near the beginning of its load carrying period will cause the thickness of the oil film to be rapidly reduced, resulting in the operation of the loaded bearing surfaces during the remainder of this period with a thin oil film that may be insufficient to adequately prevent wear. Such operation should also result in relatively higher viscous losses and heating of the oil, as well as reduction of the bearing capacity.

If, however, the load transfer point of a rocking bearing is selected so that the peak load forces are applied at the end of the load carrying period of one of the pairs of opposed bearing surfaces, this pair of surfaces operates throughout most of its load carrying period with a maximum oil film thickness which is squeezed to the minimum only at the end of the period, when the heavy load is applied. In this way, the lighter load portions of the cycle may be carried on relatively thick oil films with a minimum of viscous friction and heat loss and the oil film is thinned down to a higher load carrying capacity only during a very brief portion of each cycle, during which the maximum loads are applied.

These and other advantages of the invention will be more clearly understood from the following description of a preferred embodiment of the invention, taken together with the accompanying drawings.

DESCRIPTION OF THE PREFERRED EMBODIMENT

Figure 1:
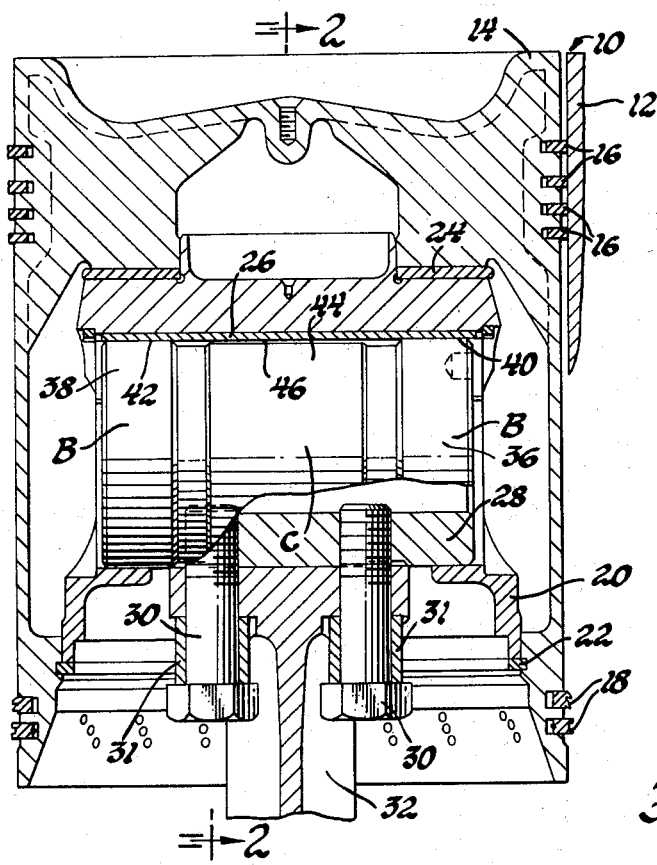
FIG. 1 is a transverse cross sectional view of an engine piston-connecting rod assembly having bearing means according to the invention as viewed in the plane of the piston and piston pin axes.
Figure 2:
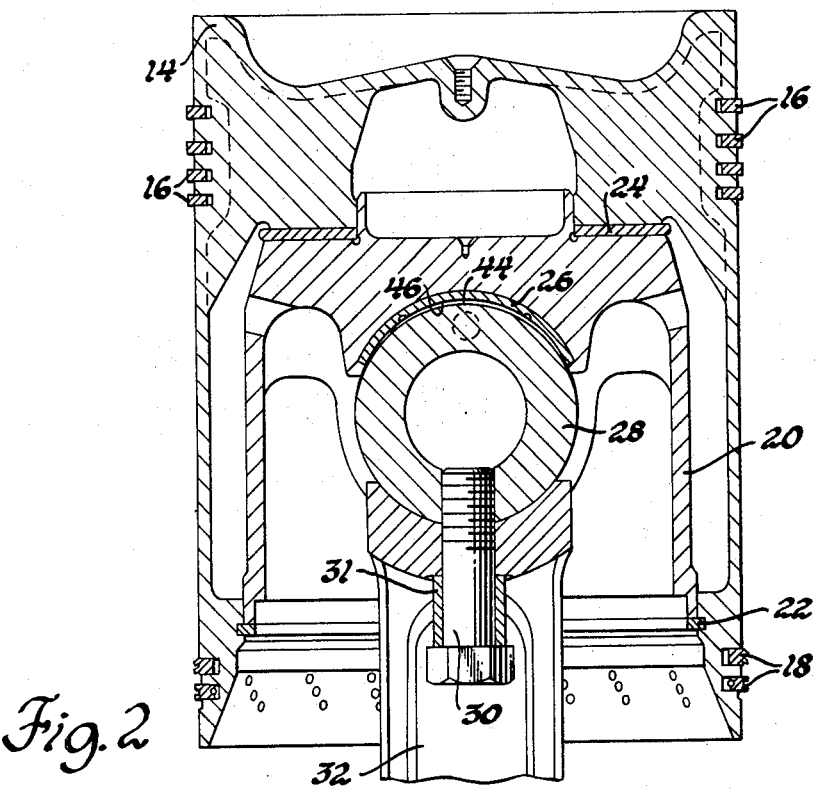
FIG. 2 is a transverse cross sectional view of the assembly of FIG. 1 taken in the plane generally indicated by the line 2—2 of FIG. 1, which is perpendicular to the piston pin axis.

In the drawings, numeral 10 generally indicates an internal combustion engine of a well known medium speed two-stroke cycle diesel type which is in wide commercial use as a prime mover for diesel electric locomotives and the like. Engine 10 includes a plurality of cylinders 12, in each of which is reciprocably disposed a piston 14 carrying a plurality of cylinder engaging compression and oil control piston rings 16 and 18, respectively.

Piston 14 is supported for free floating rotational movement about its axis by a carrier 20, being retained in assembly with the carrier by a snap ring 22. A thrust washer 24 provides a bearing for the transfer of compressive loads between the piston and carrier and forms a part of the piston assembly, made up of the piston, carrier, snap ring and thrust washer members.

Carrier 20 retains an insert bearing 26 and receives a generally cylindrical piston pin 28 journalled against the insert bearing 26 in a manner which will be subsequently more fully described.

Piston pin 28 is secured by bolts 30 and spacers 31 to a connecting rod 32. As is shown in FIG. 3, the connecting rods 32, 33 of the opposite V-arranged cylinders serve to connect the piston pins 28 and therefore the piston assemblies of their respective cylinders to the associated crank pin 34 of the engine crankshaft for conversion of the reciprocating piston motion to rotary motion.

Each of the engine piston pins 28 and their associated insert bearings 26 are formed with two sets of bearing areas identified as B and C. Areas B of the piston pins are, in the disclosed arrangement, made up of two separate surfaces 36, 38 formed at opposite ends of each piston pin and arranged in opposed relation with corresponding surfaces 40, 42, which make up Areas B of the insert bearing 26. Areas C of the piston pins comprise a single surface 44 located intermediate the surfaces 36, 38 of each pin and disposed in opposed relation with the corresponding surface 46 which makes up Area C of each insert bearing.

In the disclosed embodiment, the two surfaces making up Area B for each pin are equal in total area to the single surface making up Area C. However, it should be understood that Areas B and C could equally well be made with differing areas if desired to provide for the varied loading characteristics of any particular bearing arrangement. In like manner, the Areas B and C could be arranged in any desired fashion and made up of any number of separate surfaces found suitable in a particular application.

Figure 3:
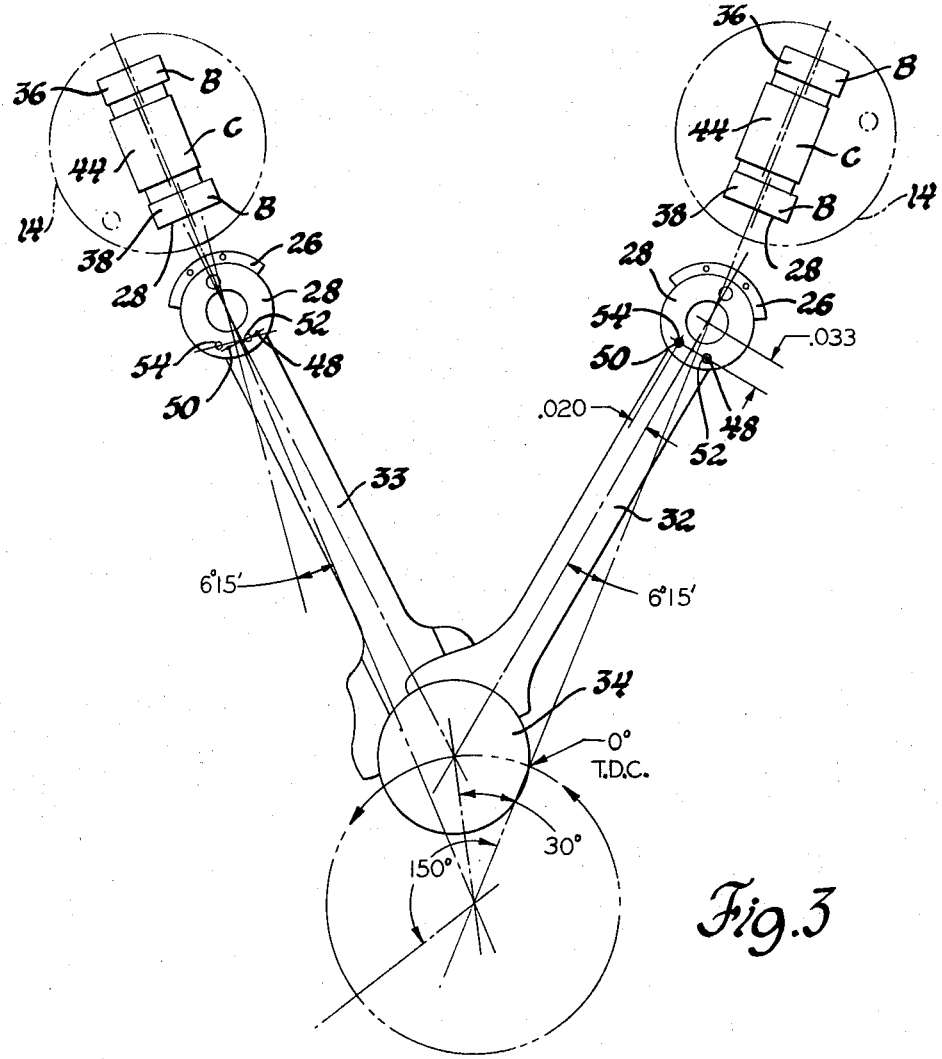
FIG. 3 is a diagrammatic view illustrating the application of the invention to the pistons of a V-type engine.

As is best shown in FIG. 3, the surfaces of the piston pin Areas B and C are formed as arcs from different centers 48 and 50, respectively, that are spaced from one another on a line generally perpendicular to the axis of the connecting rod by a small but significant dimension called the eccentricity. In like manner, the corresponding Areas B and C of the insert bearings are also arcuately formed from spaced centers 52 and 54, respectively, having equivalent eccentricity to that of the centers and surfaces of the piston pin. To carry out the purposes of the invention, the positioning of the eccentric centers 52, 54 of the insert bearing Areas B and C locates these centers at points equally spaced from and on a line perpendicular to a diameter of the piston pin which is oriented 6°, 15 minutes clockwise from the axis of the respective engine cylinder, as the assembly is viewed in FIG. 3 from the end of the engine in which the direction of crankshaft rotation is counterclockwise. Thus, the corresponding centers for the associated pin and insert bearing of each piston connecting rod assembly coincide when the connecting rod is pivoted 6° 15 minutes clockwise from the axis of the associated cylinder as viewed in FIG. 3. This occurs in the illustrated embodiment, at crank pin positions of 30° and 150° after the top dead center position of the respective piston.

Figure 4:
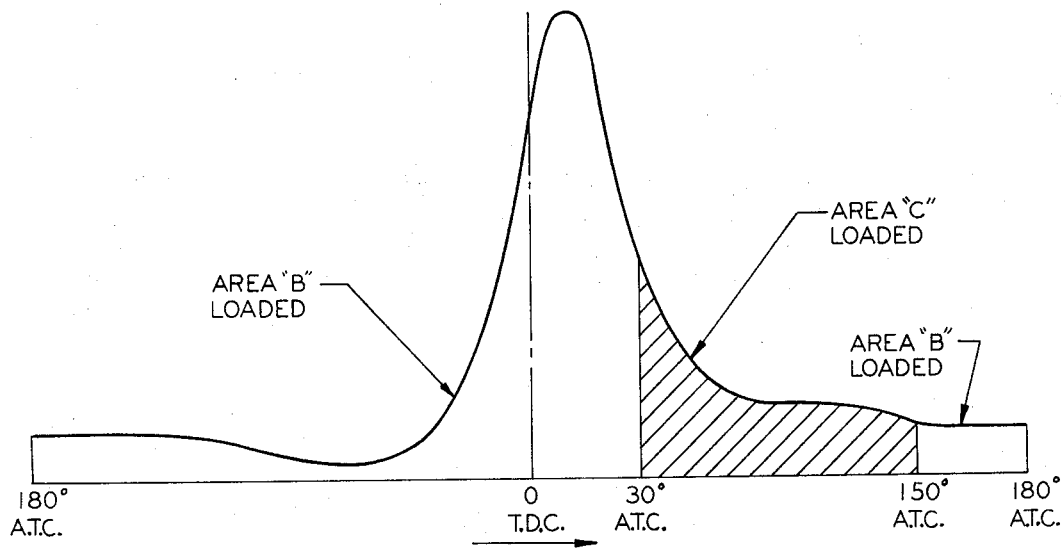
FIG. 4 is a cyclic load diagram indicating the variation in piston bearing loads over the engine cycle of a representative two-stroke cycle engine and the results on bearing loading of selection of the transfer point in a manner according to the invention.

The result of this arrangement as shown in FIG. 4 is that during operation of the engine, compression loads on each rocking piston bearing assembly are accepted by load transmitting engagement of Area B surfaces of the respective piston pin and insert bearing during part of the rotation of the crankshaft and by load transmitting engagement of the Area C surfaces of the respective piston pin and insert bearing during the remainder of the rotation of the crankshaft.

As shown in FIG. 4, the Area B surfaces are loaded from a point of crankshaft rotation beginning 150° after top center and continuing for 240° of crankshaft rotation to a point 30° after top center. The Area C surfaces are then loaded during the period beginning 30° after top center to 150° after top center. During the time when the Area B surfaces are under load, the angular movement of the connecting rod with respect to the piston rocks the surfaces of Area C apart so that lubricating oil supplied to the interior of the piston by the engine lubricating system is allowed to flow between the opposed surfaces of Area C. In like manner, during the time when the Area C surfaces are loaded, oil may flow between the separated surfaces of Area B.

The significant contribution of the present invention is that the timing of the loading of the two areas of the piston pin and its associated insert in the described manner in conjunction with a pin bearing loading pattern as illustrated in the diagram of FIG. 4 has the capability of substantially increasing bearing performance by providing a substantially greater average oil film thickness during the operating period and reducing unnecessary friction and heat losses. As may be noted from FIG. 4, the period during which Area B is loaded is characterized by a relatively low load extending from the beginning of the load period to nearly its end, at which time a rapid increase in loading to the peak load of the cycle caused by the firing of the engine is experienced. The load then rapidly drops off, at which time the changeover to Area C is made. The loading of Area C, while slightly higher at the initial portion of its load period, is actually relatively low over the full period during which it is loaded, as compared to the peak load carried by Area B.

The loading concept is based upon the realization that a rocking bearing will carry its load on a thicker film if the peak cyclic loads are not placed upon the loaded portion of the bearing in the early stages of its load carrying period. Thus, Area B is only lightly loaded during the majority of its load carrying period, during which time the oil film remains relatively thick, resulting in a minimum of friction and heat loss due to relative rotation of the bearing and piston pin components. When the high load peak occurs at the end of the Area B load period, the oil film is squeezed down to a thickness capable of carrying the heavier load but where friction and heat loss should be greater. However, operation at this thickness is brief, since the load is shortly transferred to Area C. The lower load carried by Area C during its complete loaded period permits relatively great thickness of the oil film throughout, even though the load may be slightly higher at the beginning than at the end of this period.

The exact point at which the load transfer takes place and, accordingly, the relative lengths of the load periods of the two loaded areas may be varied to suit the situation. However, the shorter of the two periods must remain sufficiently long so that movement of the connecting rod during the loaded period will be sufficient to rock the surfaces of the longer loaded area far enough apart to permit flow of an adequate film of oil therebetween before the load is again transferred to the longer loaded area. For this reason, I prefer to provide at least 120° of crankshaft rotation, during which Area C is loaded, recognizing, however, that a slightly larger or smaller period of loading might also be acceptable. Obviously, variations in the eccentricity of the bearing centers and other dimensional changes in the system could have a significant effect upon the desired load periods, as well as on other factors in the operation of the rocking piston bearing assembly.

While the invention has been disclosed by reference to a preferred embodiment, it should be understood that numerous changes might be made within the spirit and scope of the inventive concepts disclosed. Accordingly, it is desired that the invention not be limited to the embodiment disclosed but be given its full scope as permitted by the language of the following claims.

I claim:

1. In a reciprocating piston machine having a rotatable crank and an axially reciprocable piston interconnected by a connecting rod, an oscillatory bearing connection between said piston and said connecting rod and subject to a cyclic peak load, said bearing connection having first and second sets of opposed cooperating bearing surfaces arranged such that, under compressive loads, the opposed surfaces of said first set are in load transmitting engagement while the opposed surfaces of said second set are separated when said bearing connection is angularly positioned on one side of a predetermined load transfer point, and the opposed surfaces of said second set are in load transmitting engagement while the opposed surfaces of said first set are separated when said bearing connection is angularly rotated to the other side of said load transfer point, and means permitting the admission of lubricant between said opposed bearing surfaces when they are separated, said load transfer point being selected such that a load transfer from one set of opposed bearing surfaces to the other occurs during each cycle closely following the occurrence of said cyclic peak load.

2. In a two-stroke cycle reciprocating piston machine having a rotatable crank and an axially reciprocable piston interconnected by a connecting rod, an oscillatory bearing connection between said piston and said connecting rod and subject to a cyclic peak load, said bearing connection having first and second sets of opposed cooperating bearing surfaces arranged such that the transmission of compressive loads through said bearing connection occurs solely through said first set of opposed surfaces during the portion of each cycle when said bearing connection is angularly positioned on one side of a predetermined load transfer point and solely through said second set of opposed surfaces during the portion of each cycle when said bearing connection is angularly rotated to the other side of said load transfer point, and means permitting the admission of lubricant between said opposed bearing surfaces during their unloaded periods of operation, said load transfer point being selected such that said cyclic peak load occurs during the terminal part of the loaded portion of each cycle of one of said sets of opposed bearing surfaces.

3. In a two-stroke cycle internal combustion engine having a rotatable crank and an axially reciprocable piston interconnected by a connecting rod, an oscillatory bearing connection between said piston and said connecting rod, and subject to cyclic peak combustion loads significantly greater than the bearing connection loads during the remainder of each cycle, said bearing connection having first and second sets of opposed cooperating bearing surfaces arranged such that the transmission of loads through said bearing connection occurs solely through said first set of opposed surfaces during the portion of each cycle when said bearing connection is angularly positioned on one side of a predetermined load transfer point, and solely through said second set of opposed surfaces during the portion of each cycle when said bearing connection is angularly rotated to the other side of said load transfer point, and means to supply lubricant to said opposed bearing surfaces during their unloaded periods of operation, said load transfer point being selected such that said cyclic peak combustion load occurs during the terminal part of the loaded portion of each cycle of one of said sets of opposed bearing surfaces.

* * * * *